United States Patent
Lemay et al.

(10) Patent No.: US 11,295,410 B2
(45) Date of Patent: Apr. 5, 2022

(54) WRITING SURFACE BOUNDARY MARKERS FOR COMPUTER VISION

(71) Applicant: Rocket Innovations, Inc., Boston, MA (US)

(72) Inventors: Joseph Lemay, Marblehead, MA (US); Jacob Epstein, Wakefield, MA (US)

(73) Assignee: Rocket Innovations, Inc., Boston, MA (US)

( * ) Notice: Subject to any disclaimer, the term of this patent is extended or adjusted under 35 U.S.C. 154(b) by 34 days.

(21) Appl. No.: 16/845,923

(22) Filed: Apr. 10, 2020

(65) Prior Publication Data

US 2020/0327640 A1    Oct. 15, 2020

Related U.S. Application Data

(63) Continuation-in-part of application No. 29/715,127, filed on Nov. 27, 2019.
(Continued)

(51) Int. Cl.
*G06T 3/00* (2006.01)
*G06T 7/70* (2017.01)
(Continued)

(52) U.S. Cl.
CPC .............. *G06T 3/0093* (2013.01); *G06T 7/11* (2017.01); *G06T 7/194* (2017.01); *G06T 7/70* (2017.01);
(Continued)

(58) Field of Classification Search
CPC . G06T 2207/30204; G06T 2207/20132; G06T 7/70; G06T 7/11; G06T 7/194; G06T 3/0093; B43L 1/00
See application file for complete search history.

(56) References Cited

U.S. PATENT DOCUMENTS

| 295,141 A | 3/1884 | Akins |
| 536,315 A | 3/1895 | Wright et al. |

(Continued)

FOREIGN PATENT DOCUMENTS

WO    2007127451 A2    11/2007

OTHER PUBLICATIONS

Lemay, Joseph—Rocketbook _Wave: Cloud Connected Microwavable Notebook by Rocketbook-Kickstarter, retrieved from the internet under <https://www.kickstarter.com/projects/rocketbook/rocketbook-wave-cloud-connected-microwavable-noteb?ref=discovery&term=rocketbook> on Mar. 3, 2021, 18 pages.

(Continued)

*Primary Examiner* — Mia M Thomas
(74) *Attorney, Agent, or Firm* — Nutter McClennen & Fish LLP

(57) ABSTRACT

A system for capturing, organizing, and storing handwritten notes includes a plurality of fluorescently colored boundary markers. The boundary markers are configured to be positioned on a writing surface. An image of the writing surface with the fluorescent markers thereon is captured and the fluorescent colored boundary markers in the captured image are detected. A virtual boundary in the captured image is identified based on the positions of the fluorescent colored boundary markers. A portion of the captured image within the virtual boundary is unwarped to produce an unwarped image.

20 Claims, 8 Drawing Sheets

Related U.S. Application Data

(60) Provisional application No. 62/833,321, filed on Apr. 12, 2019.

(51) Int. Cl.
  *G06T 7/11* (2017.01)
  *G06T 7/194* (2017.01)
  *B43L 1/00* (2006.01)

(52) U.S. Cl.
  CPC ....... *B43L 1/00* (2013.01); *G06T 2207/20132* (2013.01); *G06T 2207/30204* (2013.01)

(56) References Cited

U.S. PATENT DOCUMENTS

| | | |
|---|---|---|
| 739,315 A | 9/1903 | Hutton, Jr. |
| 990,067 A | 4/1911 | Scott, Sr. |
| 1,058,469 A | 4/1913 | Sainberg |
| 1,331,995 A | 2/1920 | McMullen |
| 1,342,248 A | 6/1920 | Bloomquist |
| 1,353,689 A | 9/1920 | Wilkie |
| 1,357,971 A | 11/1920 | Fisher |
| 1,625,724 A | 4/1927 | Huszti-Horvath |
| 1,667,279 A | 4/1928 | Allen |
| 1,712,352 A | 5/1929 | March |
| 1,748,419 A | 2/1930 | Hurley |
| 1,853,066 A | 4/1932 | MacLean |
| 1,856,160 A | 5/1932 | Gutberlet |
| 1,913,110 A | 6/1933 | Engel |
| 1,999,423 A | 4/1935 | Riley |
| 2,451,646 A | 10/1948 | Ainsworth |
| 2,517,535 A | 8/1950 | Cross |
| 2,540,907 A | 2/1951 | Paschal |
| D167,784 S | 9/1952 | Whitaker |
| 2,728,451 A | 12/1955 | Leander |
| 2,791,948 A | 5/1957 | Flood |
| 2,885,139 A | 5/1959 | Werner et al. |
| 2,991,577 A | 7/1961 | Bellocchio |
| 3,280,789 A | 10/1966 | Lewis et al. |
| D220,216 S | 3/1971 | Coder |
| 3,720,035 A | 3/1973 | Rutter |
| 3,946,868 A | 3/1976 | Rutter |
| 4,138,116 A | 2/1979 | Siders, Jr. |
| D270,636 S | 9/1983 | Foreman, Sr. |
| 4,537,001 A | 8/1985 | Uppstrom |
| 4,796,553 A | 1/1989 | Cogswell et al. |
| D307,301 S | 4/1990 | Kraus |
| D316,188 S | 4/1991 | Connor et al. |
| 5,217,256 A | 6/1993 | Lomas |
| 5,277,452 A | 1/1994 | Skidmore |
| D361,601 S | 8/1995 | Goldman et al. |
| 5,634,667 A | 6/1997 | Jordan |
| D392,112 S | 3/1998 | Cynkar et al. |
| 6,629,607 B1 | 10/2003 | Gibson |
| D492,729 S | 7/2004 | Shinya |
| D502,866 S | 3/2005 | Woollard |
| 6,874,968 B2 | 4/2005 | Schwartz |
| 7,024,811 B1 | 4/2006 | Cole |
| 7,828,151 B2 | 11/2010 | Murdoch et al. |
| 7,918,047 B1 | 4/2011 | Ngan |
| 8,128,125 B1 | 3/2012 | Ngan |
| 8,276,285 B1 | 10/2012 | Bennett |
| D731,492 S | 6/2015 | Snyder et al. |
| 9,114,924 B2 | 8/2015 | Titkos |
| D754,016 S | 4/2016 | Bejarano |
| 9,844,965 B1* | 12/2017 | Lemay ............... B42D 15/0006 |
| 9,964,557 B2* | 5/2018 | Denney ................. G06T 7/13 |
| 10,034,645 B1* | 7/2018 | Williams ............. A61B 5/168 |
| 10,127,468 B1* | 11/2018 | Lemay ................ G06K 9/2063 |
| 10,242,501 B1* | 3/2019 | Pusch ....................... G06T 7/70 |
| 10,452,908 B1* | 10/2019 | Ramanathan ........... G07D 7/14 |
| D867,506 S | 11/2019 | Montanaro et al. |
| 10,474,922 B1* | 11/2019 | Lemay ................ G06K 9/2063 |
| 10,618,345 B2 | 4/2020 | Lemay et al. |
| D887,179 S | 6/2020 | Bundy |
| D893,290 S | 8/2020 | Wojcik et al. |
| D914,089 S | 3/2021 | Tang |
| 2002/0089166 A1 | 7/2002 | Schwartz |
| 2004/0131232 A1 | 7/2004 | Meisner et al. |
| 2004/0261308 A1 | 12/2004 | Lang |
| 2005/0269814 A1 | 12/2005 | Dillavou et al. |
| 2005/0274631 A1 | 12/2005 | Martin |
| 2007/0077419 A1 | 4/2007 | Tamai et al. |
| 2007/0125925 A1 | 6/2007 | Busam et al. |
| 2009/0250367 A1 | 10/2009 | Murdoch et al. |
| 2010/0205843 A1 | 8/2010 | Winscot |
| 2012/0193530 A1* | 8/2012 | Parker .................. H01J 37/228 250/307 |
| 2014/0014549 A1 | 1/2014 | Zhao et al. |
| 2014/0297646 A1 | 10/2014 | Bastiaens et al. |
| 2015/0125846 A1 | 5/2015 | Langford |
| 2015/0335392 A1* | 11/2015 | Richards ................ A61B 90/39 40/638 |
| 2016/0339337 A1 | 11/2016 | Ellsworth et al. |
| 2018/0134068 A1* | 5/2018 | Lemay .................. B42D 1/008 |
| 2018/0238802 A1 | 8/2018 | Sywe et al. |
| 2019/0037171 A1 | 1/2019 | Nagpal et al. |
| 2019/0072693 A1 | 3/2019 | Saito |
| 2019/0084341 A1 | 3/2019 | Franco |
| 2019/0092073 A1* | 3/2019 | Epstein .................... B42D 3/18 |
| 2019/0156086 A1* | 5/2019 | Plummer ............. G06K 7/1413 |
| 2019/0254413 A1* | 8/2019 | Jacobson ........... A46B 15/0085 |
| 2020/0082496 A1* | 3/2020 | Chong .................... G06T 3/005 |
| 2020/0398602 A1* | 12/2020 | Epstein ................... B42D 1/06 |
| 2021/0034870 A1* | 2/2021 | Ha ....................... G06K 9/6202 |
| 2021/0093385 A1* | 4/2021 | Morvan ............. A61B 17/1703 |
| 2021/0174473 A1 | 6/2021 | Lung et al. |

OTHER PUBLICATIONS

Lemay, Joseph—The Everlast Notebook by Rocketbook—Kickstarter, retrieved from the internet under <https://www.kickstarter.com/projects/rocketbook/everlast?ref=discovery&term=rocketbook> on Feb. 24, 2021, 17 pages.

Lemay, Joseph—Rocketbook Wave: Cloud-Ready Microwavable Notebook, retrieved from the internet under <https://www.indiegogo.com/projects/rocketbook-wave-cloud-ready-microwavable-notebook#/> on Feb. 24, 2021, 11 pages.

Hanson, Grant, Think Board X—Powered by Rocketbook dated Oct. 2, 2018, retrieved from the internet under <https://www.indiegogo.com/projects/think-board-x-powered-by-rocketbook#/updates/all> on Feb. 24, 2021, 13 pages.

Hanson, Grant, Think Board X—Powered by Rocketbook funding period Sep. 10, 2018-Sep. 30, 2018, retrieved from the internet under <https://www.kickstarter.com/projects/960330975/think-board-x-powered-by-rocketbook?ref=discovery&term=rocketbookl> on Feb. 24, 2021, 23 pages.

Hanson, Grant, Think Board—Peel & Stick Whiteboard Films—Powered by Kickstart dated Jul. 2, 2014, retrieved from the internet under <https://www.kickstarter.com/projects/960330975/think-board-a-creative-space-for-endless-ideas/posts/898021> on Mar. 26, 2021, 5 pages.

[No Author Listed] Think Board; Title: The Thinkboard X: Kickstarter & Indiegogo Campaign, date of video Sep. 10, 2018 retrieved from the internet under on Mar. 26, 2021 <https://www.youtube.com/watch?v=yP87NEYIiTw>.

Wedel, Chris, Think Board X2 review—A whiteboard that's more than meets the eye, dated Jun. 16, 2020, retrieved from the internet under <https://www.androidcentral.com/think-board-x2-review> on Mar. 26, 2021, 18 pages.

Warwick, Stephen, The Think Board X2 is a whiteboard you can use with the cloud, dated May 15, 2020, retrieved from the internet under <https://www.imore.com/think-board-x2-whiteboard-you-can-use-cloud> on Mar. 26, 2021, 9 pages.

International Search Report and Written Opinion for International Application No. PCT/US20/27687, dated Jul. 6, 2020 (11 pages).

Non-Final Office Action issued by the United States Patent and Trademark Office for U.S. Appl. No. 29/715,127 dated Sep. 24, 2021.

(56) References Cited

OTHER PUBLICATIONS

Rocketbook Beacons—Digitize Your Whiteboard, Reusable Stickers, by Rocketbook Store, 2859 ratings, Item Model Mumber: BEA-A4-K, ASIN: B07X7KRFFB, online on Amazon.com, Date First Available: Aug. 30, 2019.

* cited by examiner

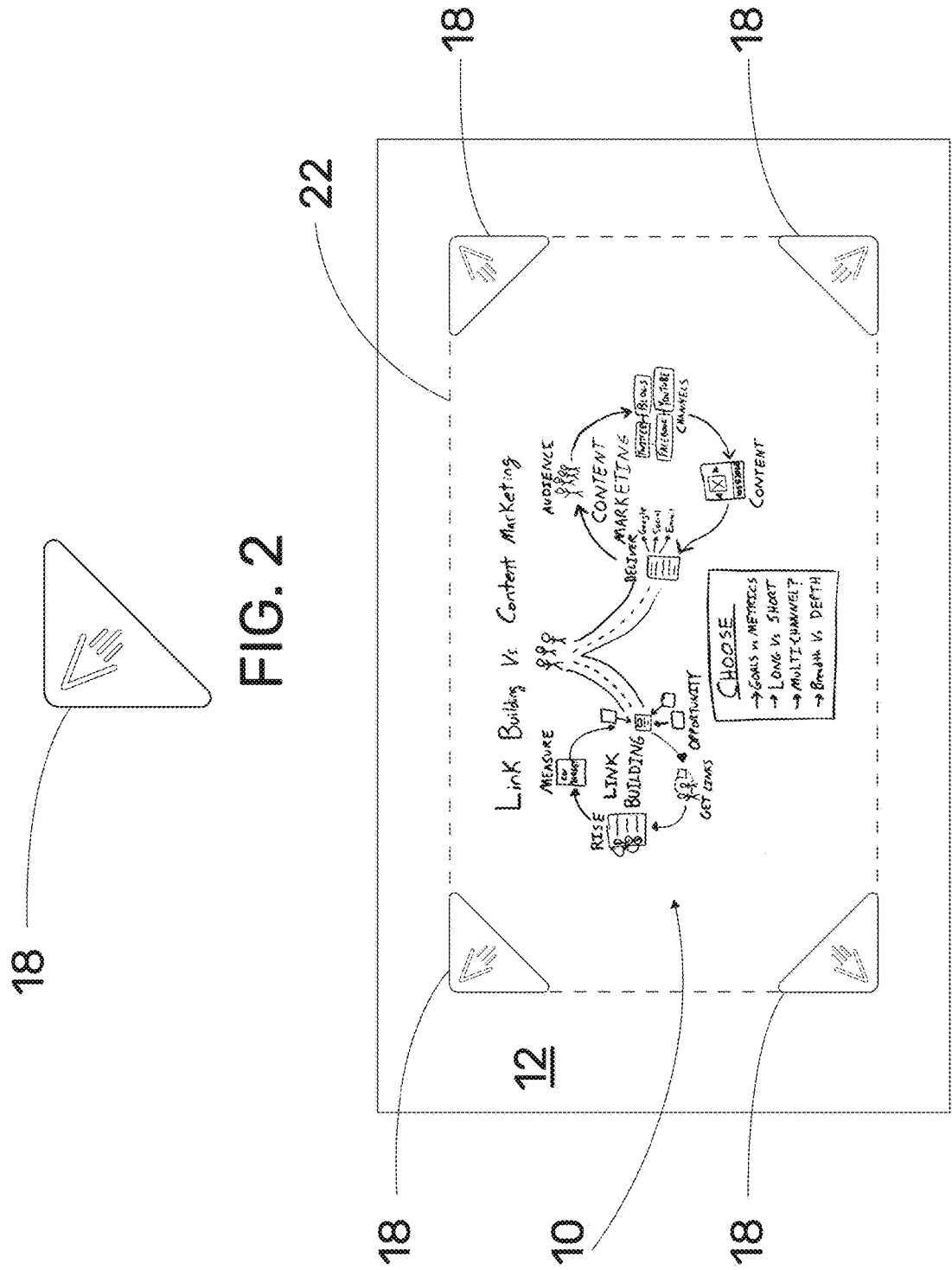

WRITING SURFACE BOUNDARY MARKERS FOR COMPUTER VISION

PRIORITY AND CROSS REFERENCE TO RELATED APPLICATIONS

This patent application claims priority from U.S. provisional patent application No. 62/833,321, filed Apr. 12, 2019, which is incorporated herein by reference in its entirety.

This patent application is a continuation-in-part of U.S. design patent application No. 29/715,127, filed Nov. 27, 2019, which is incorporated herein by reference in its entirety.

STATEMENT REGARDING PRIOR DISCLOSURES BY THE INVENTOR OR A JOINT INVENTOR UNDER 37 C.F.R. 1.77(b)(6)

Aspects of the present invention were disclosed by way of a Kickstarter campaign named "Rocketbook Beacons: A Digital Miracle For Whiteboards" begun on Dec. 3, 2018, which can be accessed at https://www.kickstarter.com/projects/642311833/get-rocketboard/description. Additionally, aspects of the present invention were disclosed by way of an Indiegogo campaign named "Rocketbook Beacons: Digital Miracle 4 Whiteboards" begun on Mar. 20, 2019, which can be accessed at https://www.indiegogo.com/projects/rocketbook-beacons-digital-miracle-4-whiteboards#/updates/all. Applicant believes that such disclosures are subject to the exceptions of 35 U.S.C. 102(b)(1)(A) or 35 U.S.C. 102(b)(2)(a) as having been made or having originated from one or more members of the inventive entity of the application under examination. However, out of an abundance of caution, and pursuant to the guidance of 78 Fed. Reg. 11076 (Feb. 14, 2013), Applicant is identifying these disclosures in the specification in lieu of filing a declaration under 37 C.F.R. 1.130(a).

FIELD OF THE INVENTION

Illustrative embodiments of the invention generally relate to markers placed on a writing surface to define a boundary and, more particularly, the illustrative embodiments of the invention relate to machine-vision identification of the position of the markers.

BACKGROUND OF THE INVENTION

Students and professionals frequently write on whiteboards. In some collaborative efforts, such as during a study session or team meeting, a picture of the writing on the whiteboard may be taken by a user to memorialize or share the notes from the meeting. Users may take pictures of the whiteboard to have a record of the notes on their phone, and to share with their colleagues.

SUMMARY OF VARIOUS EMBODIMENTS

In accordance with one embodiment of the invention, a system for capturing, organizing, and storing handwritten notes includes a plurality of boundary markers. The boundary markers are configured to be positioned on a writing surface. Furthermore, the plurality of boundary markers have a fluorescent color. The system also includes a tangible non-transitory computer readable medium encoded with instructions which, when run on a camera-equipped computing device, causes the camera-equipped computing device to execute processes. The processes include capturing an image of the writing surface with the fluorescent markers thereon. The processes also include detecting the fluorescent colored boundary markers in the captured image. Additionally, the processes include identifying a virtual boundary in the captured image based on the positions of the fluorescent colored boundary markers. The processes then unwarp a portion of the captured image within the virtual boundary to produce an unwarped image.

In some embodiments, the boundary markers are a fluorescent orange color. The markers may have a generally triangular shape. Furthermore, the markers made be formed from silicone. In various embodiments, the markers couple to the writing surface using an adhesive and/or microsuction. Furthermore, the markers may be portable and easily graspable. To that end, the markers may have a thickness of between about 0.5 millimeters and about 3 millimeters.

In some embodiments, the processes executed by the camera-equipped computing device further comprise broadcasting the unwarped image. Additionally, the broadcast may be updated as new images are captured. Other processes may include saving the unwarped image in an image store. Additionally, or alternatively, the processes may further include cropping the boundary markers out of the image. Some other processes may include removing the background from the captured image, cropping the captured image using the virtual boundary in the image, and/or enhancing the image. In various embodiments, the processes performed by the computing device are performed in response to taking a picture of the writing surface. The writing surface may include a whiteboard or a wall.

In accordance with another embodiments, a method for capturing and storing handwritten notes includes placing a plurality of boundary markers on a writing surface. The boundary markers define a virtual boundary encompassing the handwritten notes. The method includes capturing a writing surface image by scanning the writing surface with an electronic device. Additionally, the method identifies the position of the markers in the writing surface image. The method also determines the boundary based on the positions of the markers in the writing surface image. The method may also unwarp a portion of the captured image within the virtual boundary to produce an unwarped image. The unwarped image may then be cropped based on the position of the detected boundary.

Among other options, placing the plurality of boundary markers includes positioning the boundary markers at positions that approximately define corners of a rectangular boundary. Identifying the position of the markers may include identifying the fluorescent color in the image. The unwarped image may be stored and/or broadcasted.

A second writing surface image may be captured by scanning the writing surface with the electronic device. The method may then identify the position of the markers in the second writing surface image, and determine the boundary based on the position of the markers in the second writing surface image. The method may then unwarp the second writing surface image, as a function of detecting the boundary in the captured second writing surface image, to produce a second unwarped image. The method may also crop the second unwarped image based on the position of the detected boundary. In some embodiments, the broadcasting of the unwarped image may be updated to broadcast the second unwarped image.

In accordance with yet another embodiment, a marker for detection by machine vision includes a first surface having a fluorescent color. The first surface is configured to be viewed by machine vision. The marker has a second surface with a surface coupling portion. The surface coupling portion is configured to couple to a writing surface such that the marker remains coupled to the writing surface when the writing surface is in a vertical orientation.

Among other shapes, the shape of the marker may correspond to at least a portion of a shape of an edge of the writing surface. The writing surface may be a whiteboard. The marker may couple to the writing surface using a microsuction layer. In some embodiments, the marker is formed from a material that does not retain visible folding patterns. The marker, or a majority thereof, may be formed from silicone. Accordingly, the marker may be washable and reusable.

In accordance with another embodiment, a system for sharing handwritten notes includes a computer device coupled with a camera. The camera is configured to view a background having content. The system also includes a plurality of boundary markers having a fluorescent color. The boundary markers are configured to be positioned between the background and the camera so as to define a virtual boundary around a portion of the background that includes the content. The computer device is configured to: (1) detect the fluorescent color boundary markers, (2) determine the virtual boundary, and (3) deskew the portion of the background as a function of the shape of the virtual boundary to produce a deskewed image of the portion of the background. The computer device is further configured to share the deskewed image of the portion of the background.

Among other ways, the boundary markers may be held together by a frame. The frame may have an outer marker holding portion and an inner portion to be imaged (also referred to as an image portion). The marker holding portion may be formed from plastic or metal. The marker holding portion may be shaped to hold the markers in a predefined orientation that corresponds to the virtual boundary. The image portion may include a preset background, or an aperture/opening through which a background may be viewed.

The frame may have a boundary marker positioned at one or more vertexes of the marker holding portion, so that the positioned markers define a virtual boundary, such as a rectangle. During use, the frame may be positioned between the camera and the background. In some other embodiments, the frame may have a transparent annotation surface over the image portion. The annotation surface can be annotated and/or marked using a writing utensil. In some other embodiments, the image portion may include a preset background. The image portion may be deskewed and/or shared with participants. The image portion may be shared as an image or video.

Some embodiments may include a kit having a plurality of boundary markers. The boundary markers may have a top surface opposite a bottom surface. The top surface may have a fluorescent color, and the bottom surface may be configured to adhere to a writing surface. The writing surface may be a white board. The boundary markers may be shaped as triangles. In some embodiments, the kit may include four boundary markers.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2 schematically shows a boundary marker in accordance with illustrative embodiments of the invention.

FIG. 3 schematically shows a plurality of boundary markers forming a virtual boundary in accordance with illustrative embodiments of the invention.

DESCRIPTION OF ILLUSTRATIVE EMBODIMENTS

In illustrative embodiments, a set of boundary markers that define a virtual boundary are placed on a writing surface, such as a whiteboard. Inside of the virtual boundary may be notes, writing, printing, pictures, or other objects (e.g., a model) that the user may wish to capture in an image. A camera-equipped computing device (e.g., a smartphone) views the writing surface, and machine vision identifies the markers and determines the virtual boundary based on the position of the markers. In some embodiments, an image of the writing surface is captured and processed (e.g., cropping out the markers and parts of the image outside of the virtual boundary defined by the markers, deskewing the image, and/or enhancing the image). The processed image may be stored in a database, and may also be shared with others. Details of illustrative embodiments are discussed below.

Figure 1:
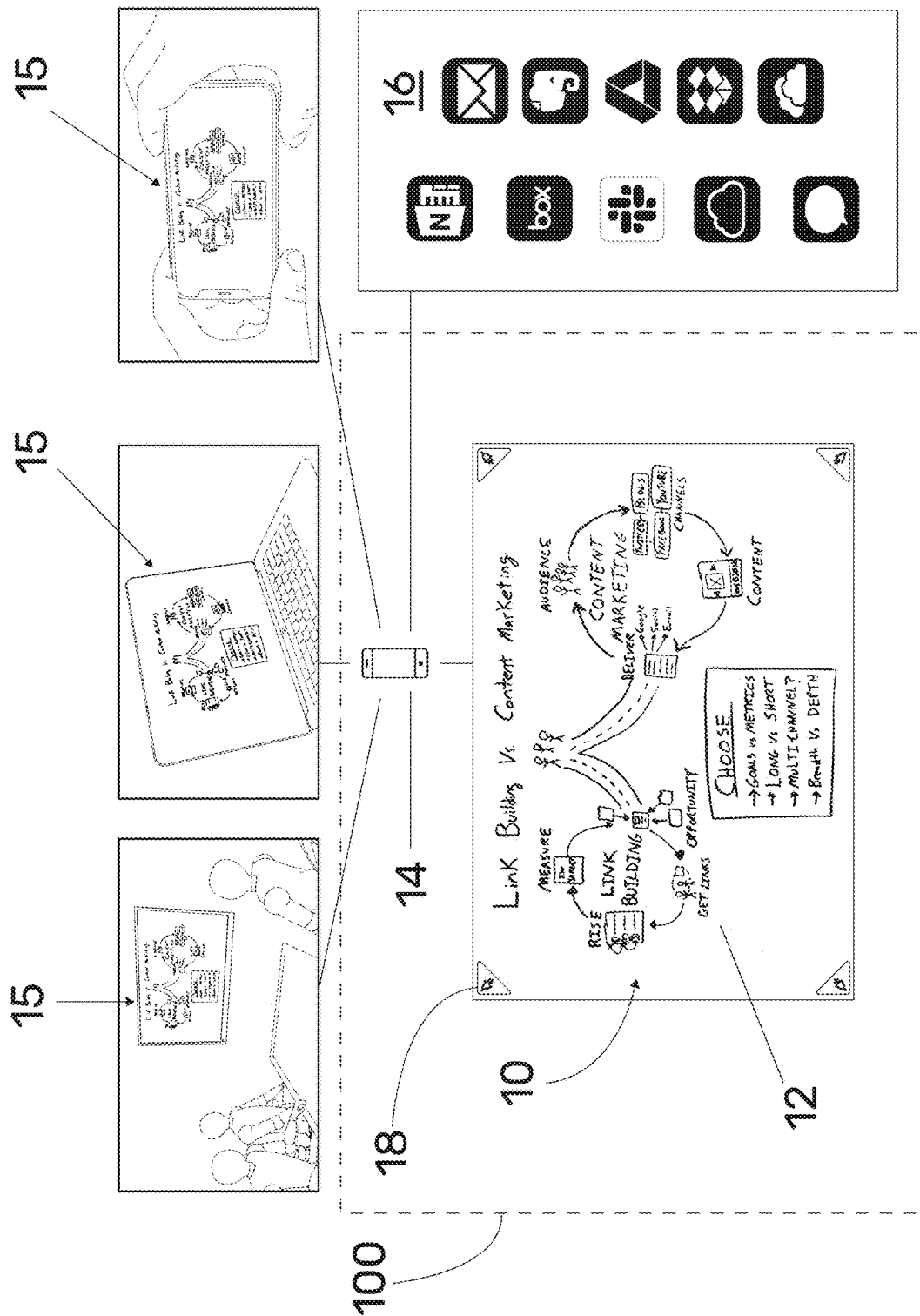
FIG. 1 schematically shows an example of a system for capturing, storing, and/or sharing images from a writing surface in accordance with illustrative embodiments of the invention.

FIG. 1 schematically shows an example of a system 100 for capturing, storing, and/or sharing images from a writing surface 12 in accordance with illustrative embodiments of the invention. Although the above description states that the system 100 captures, stores, and shares images, it is possible to use the system 100 to capture, store, or share images without performing all three actions. For example, the system 100 could be used to stream share images from the writing surface 12 without storing the images. Alternatively, in some embodiments, the system 100 may be used to capture and store an image, without simultaneously sharing.

The system 100 includes a writing surface 12 having content 10 thereon. The content 10 could be any kind of writing, drawing, scribbles, etc. Illustrative embodiments include markers 18 that are placed on the writing surface 12. For convenience, the writing 10 is referred to as notes 10 through the application. It should be understood that the terms "writing" and "notes" 10 are not intended to limit the type of writing, drawings, markings, or other content that can be present on a writing surface 12. Instead, the terms "writing" and "notes" are merely used to facilitate an easier understanding of how to make and use illustrative embodiments of the invention. It should further be understood that illustrative embodiments are not limited to capturing of content 10 that includes alphanumerical writing. Indeed, as discussed further below, the content 10 can include a variety of notes, writing, printing, pictures, and/or other objects (e.g., a model), including objects that are not on the writing surface 12.

As an example, the notes 10 may be created during a collaborative working session. FIG. 1 schematically shows a plurality of participants 15 with whom the notes 10 are shared. Some of the participants 15 may access the collaborative working session remotely (e.g., via dial-in, Internet, or various messaging systems), and may benefit from seeing the notes 10 on an electronic device. For example, as shown, some of the participants 15 may wish to view the notes 10 on a television, a computer, and/or a smartphone device. Illustrative embodiments capture, deskew and enhance images of the notes 10. The notes 10 may be saved locally on the device 14 or on cloud storage, forwarded to an application 16, and/or broadcast to others. Furthermore, the broadcast may be updated in real time as notes 10 are updated and/or changed. Accordingly, illustrative embodiments provide for easy sharing of the notes 10 among the various participants.

To that end, the system 100 includes a camera-equipped computing device 14 that captures one or more images including the markers 18 on the writing surface 12. The markers 18 may define the virtual boundary (shown in broken lines as virtual boundary 22 in FIG. 3 below) that encompasses the notes 10 or portion thereof that the user wishes to save and/or share. The device 14 is optionally coupled over the internet to a system cloud service, and third-party cloud services 16. In other embodiments, rather than a network connection through the internet to the cloud service 16, the cloud service 16 is within a local area network, a wide area network, or a virtual network such as a VPN (virtual private network). Additionally, or alternatively, some of the services may be used locally on the device 14.

Among other things, the camera-equipped computing device 14 may include any computing device coupled to a camera, including but not limited to a camera-equipped smartphone, a camera-equipped tablet computer, a desktop computer with a USB-connected camera, and a laptop computer coupled to a camera. In addition to these traditional camera-equipped computing devices 14, illustrative embodiments may further include machine vision machines, and/or camera-equipped headsets (e.g., helmets).

FIG. 2 schematically shows the boundary marker 18 in accordance with illustrative embodiments of the invention. As mentioned previously, one or more of the boundary markers 18 may be placed on the writing surface 12 to define the desired boundary 22 on the writing surface 12. To that end, illustrative embodiments may have a shape configured to correspond to the writing surface 12. For example, the marker 18 shown in the figure has a triangular shape with a right angle that corresponds to a corner of a traditionally rectangular whiteboard. Shape correspondence between the marker(s) 18 and the writing surface 12 provides easy positioning of the marker(s) 18 along the edges of the writing surface 12, although it should be noted that the marker(s) 18 are not required to be positioned along the edges of the writing surface 12. However, it should be understood that illustrative embodiments may include a marker 18 of any shape, and are not limited to triangular shapes or shapes that correspond to the writing surface 12. Thus, for example, the markers 18 may be round, square, or other shape.

The notes 10 may be on various types of writing surfaces 12, including, for example, a wall, a whiteboard, a projector, a chalkboard, a glass panel, or paper. Furthermore, the notes 10 may contain a variety of content, such as words, pictures, and/or drawings. In illustrative embodiments, the boundary markers 18 are positioned on the writing surface in such a way that they form a non-continuous perimeter/boundary (e.g., the four corners of a virtual boundary) around the notes 10 that the user wants to capture in an image. It should be understood that the markers 18 can be positioned to form the virtual boundary around the entirety of the writing surface 12, a portion of the writing surface 12 (e.g., just the notes 10 on the writing surface 12), or just a portion of the notes 10. Accordingly, users may choose the portion of the writing surface 12 to capture by forming the virtual boundary 22 using the markers 18. The user can reposition the markers 18 in order to focus on different portions of the notes 10, even if, for example, the camera captures the entire writing surface 12 in a number of successive images.

The marker 18 may be formed from a variety of materials, including one or more of rubber, silicone, and/or polypropylene. Additionally, at least one side of the marker 18 may have a writing surface coupling portion, such as an adhesive (e.g., including permanent adhesives, static cling adhesives and other semi-permanent adhesives), electrostatic adhesion layer, and/or microsuction adhesion layer, to provide reliable attachment to the writing surface 12. Preferably, the coupling portion provides sufficient coupling such that the markers 18 do not fall from the writing surface 12 because of their weight (e.g., such as when the writing surface 12 is in a vertical orientation). Additionally, illustrative embodiments may form the marker 18 from the previously mentioned materials, or other materials, such that the markers 18 are reusable and washable. In some embodiments, the markers 18 may be about 0.5 mm to about 3 mm (e.g., 1/32 of an inch) thick, providing for easy grasping and removal from the writing surface 12 while remaining portable. Furthermore, the markers 18 may be provided in a kit (e.g., in a pack of four) to facilitate boundary 22 detection (e.g., a rectangular boundary), as shown in FIG. 3.

The inventors discovered and were surprised to find that fluorescent colored markers 18 are more easily and reliably identified by machine vision, including camera equipped computer devices 14. It should be noted that the inventors are not privy to the to the exact reason for why fluorescent markers 18 and/or fluorescent colors are more easily identified by machine vision. However, the inventors suspect, but have not confirmed, that the mechanism of action for this effect is because of the distinct visible light emitted by the fluorescent colors (e.g., a "glow") in response to absorption of light in the non-visible radiation spectrum (e.g., ultraviolet). As an additional advantage, in illustrative embodiments, the fluorescent colors are more easily detectable in poor light conditions because of their ability to reflect light absorbed in the non-visible spectrum. Some illustrative embodiments use markers 18 having colors that are not commonly found in office environments (e.g., orange fluorescent markers 18 that do not "compete" with other colors on a common whiteboard environment).

FIG. 3 schematically shows a plurality of boundary markers 18 forming a virtual boundary 22 in accordance with illustrative embodiments of the invention. As shown here, the markers 18 are offset from the corners of the whiteboard 12, but in other embodiments, some or all of the markers 18 could be placed up against the corners of the whiteboard 12. As described previously, the placement of the markers 18 define the virtual boundary 22. It should be understood that the virtual boundary 22 shown in the figure is not physically present on the writing surface. Instead, the virtual boundary 22 is created by the system 100 as a result of identifying the position of the markers 18. Thus, machine vision detects the markers 18 and determines the virtual boundary 22 formed by the markers 18. In some embodiments, determining the virtual boundary 22 may include correlating the position of the markers 18 with an expected image shape. Although not explicitly described here, a person of skill in the art understands that machine vision may detect the markers 18, and some separate logic may determine the virtual boundary 22 (e.g., using a cloud based server).

Illustrative embodiments may use a variety of different portions of the markers 18 to determine the virtual boundary 22. For example, as shown, the virtual boundary 22 may be defined by the outside edges of the markers 18. However, in some embodiments, the inner edges of the markers 18 may be used to identify the virtual boundary 22. For example, the midpoint of hypotenuse of each of the triangular markers 18 may be used to define the virtual boundary 22. Alternatively, the midpoint of each markers 18 may be used to define the virtual boundary 22. As can be seen, these are merely exemplary, and there are a number of ways to use the markers 18 to define the virtual boundary 22. Furthermore, in some embodiments, the markers 18 may not align perfectly into the desired shape, e.g., a rectangular shape. Thus, illustrative embodiments may compensate for the offset by using various portions of the markers 18 to correspond to the expected image shape, e.g., by defining the virtual boundary 22 having a "best fit" with respect to the placement of the markers. Some embodiments may create a "best fit" that does not pass through all or any of the markers 18. For example, the "best fit" virtual boundary 22 may pass through 3 of 4 markers 18. Alternatively, the boundary 22 may be defined as being some distance inward of the markers 18. One of skill in the art can use a variety of methods for defining the boundary 22 using the markers 18 while being within the scope of illustrative embodiments of the invention.

Figure 4:
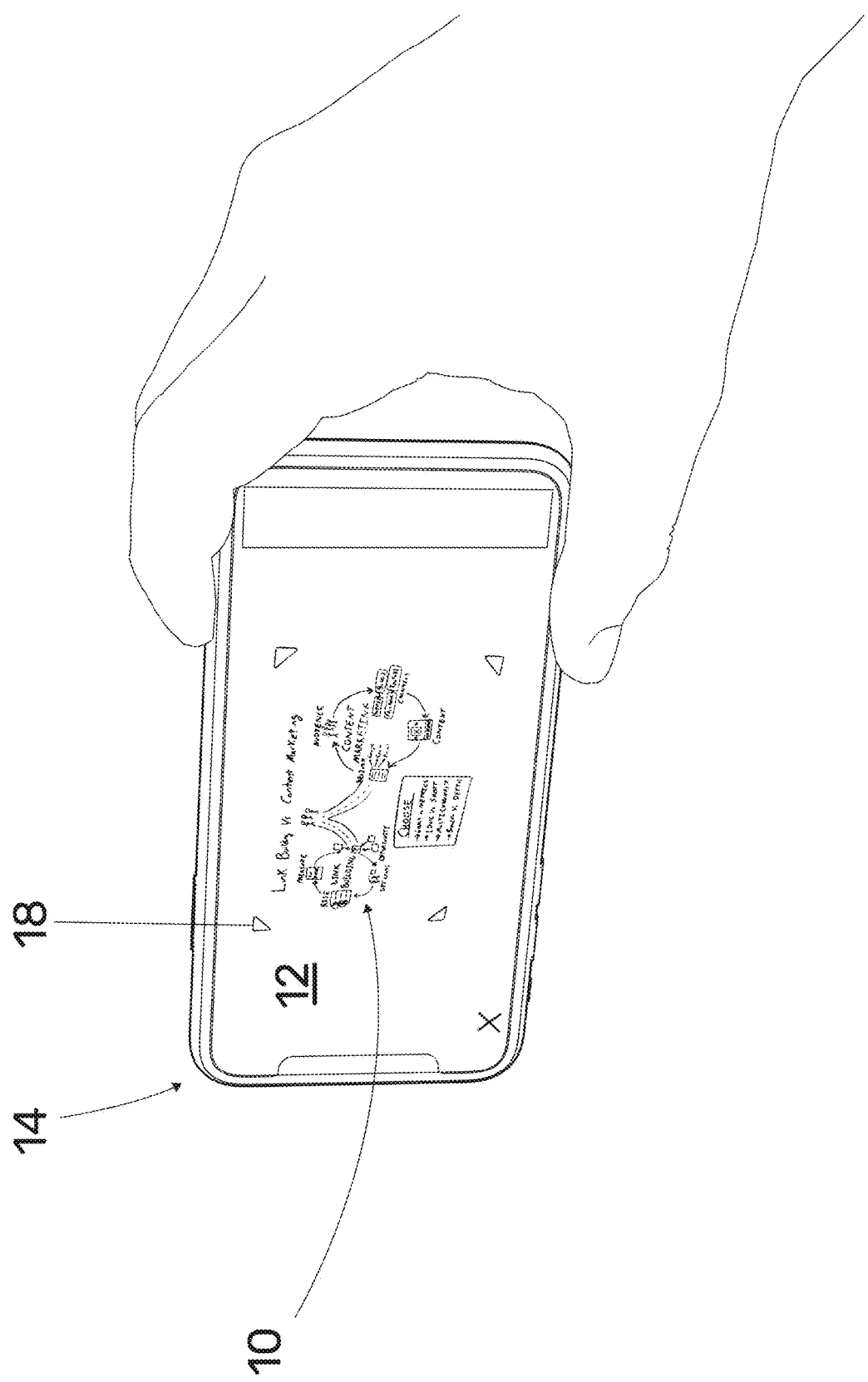
FIG. 4 schematically shows a user viewing the notes in FIG. 3 through a camera of a computing device in accordance with illustrative embodiments of the invention.

FIG. 4 schematically shows a user viewing the notes 10 in FIG. 3 through the camera of the computing device 14 in accordance with illustrative embodiments of the invention. In this example, the markers 18 are generally positioned on the writing surface 12 so as to correspond to corners of a rectangle. However, in the present viewing angle in the image captured by the camera in FIG. 4, the markers 18 appear to be positioned at the corners of a quadrangle. This depends on the relative angle of the camera 14 to the writing surface 12. However, the system 100 identifies the markers 18, creates the virtual boundary 22 based on the position of the markers 18, and deskews the image to the appropriate shape (e.g., based on the size and proportions of the markers 18, which are known).

Figure 5:
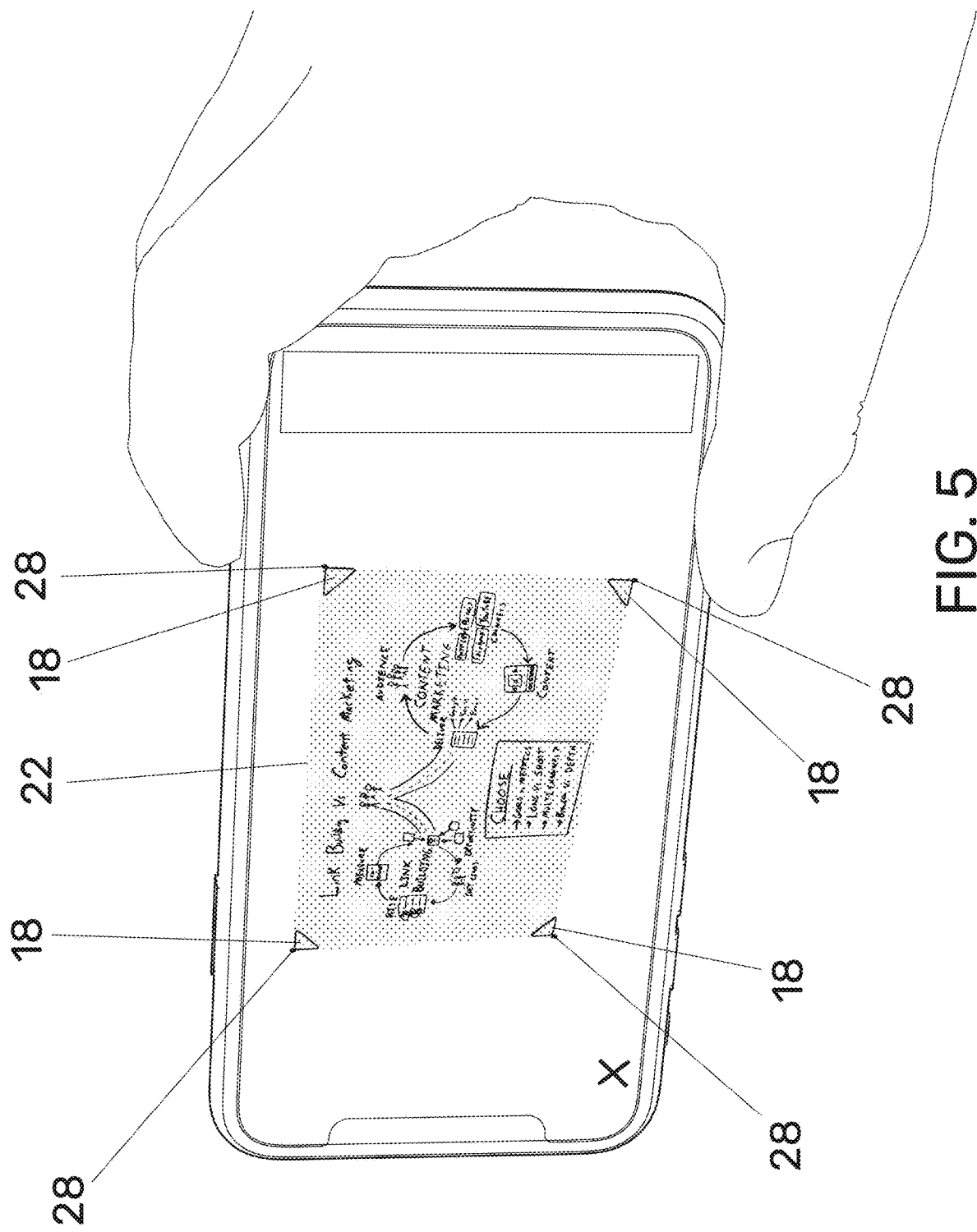
FIG. 5 schematically shows the system identifying the virtual boundary defined by the markers in FIG. 4.

FIG. 5 schematically shows the system 100 identifying the virtual boundary 22 defined by the markers 18 in FIG. 4. As shown, the system 100 uses the outside edges 28 of the markers 18 to define the virtual boundary 22. During processing, the system 100 applies computer vision transformation to unwarp each part of the image within the boundary (e.g., quadrangle) into its appropriate shape (e.g., a rectangle) and to remove the background of the image so that it is cropped to, or approximately to, the virtual boundary 22. This identification and deskewing process is similar to the identification and deskewing process for page borders that are described in U.S. Pat. No. 10,127,468, which is incorporated herein by reference in its entirety.

Figure 6:
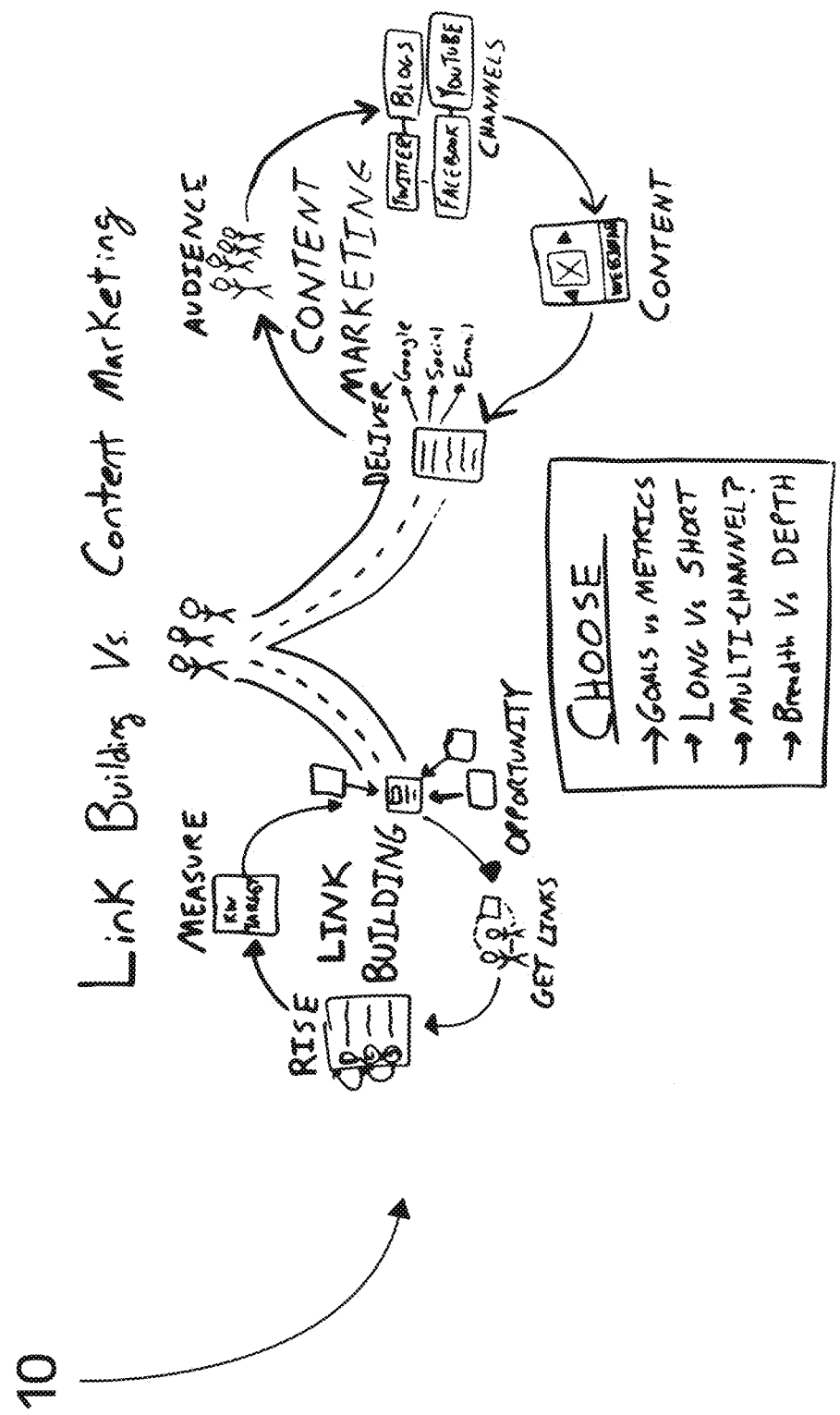
FIG. 6 schematically shows an image of the notes of FIG. 5 after processing in accordance with illustrative embodiments of the invention.

FIG. 6 schematically shows an image of the notes 10 of FIG. 5 after processing in accordance with illustrative embodiments of the invention. Specifically, the image in FIG. 6 has been deskewed and enhanced. As can be seen, although the image is taken at an angle, the deskewed image appears as if it is taken from directly in front of the notes 10. The system 100 applies computer vision transformation to unwarp each boundary into a predefined shape. For example, the quadrangle formed by the four markers 18 may be unwarped into a rectangle.

Additionally, in some embodiments, the system 100 may remove the background of the image and enhance the image. In some embodiments, the system 100 crops out the markers 18 themselves from the image, and everything outside of the boundary 22, so that the image is cropped to the virtual boundary 22. The image may also be enhanced using conventional image enhancement and filtering techniques, such as, for example, noise filtering, sharpness enhancement, contrast enhancement, color saturation increase, etc. In some embodiments, optical character recognition is performed on the scanned notes. Furthermore, the notes may automatically be assigned a title based on the words identified in the notes during OCR. After the image is captured, the notes 10 may be stored locally on the device 14, and/or may be broadcast to others (e.g., participants) and to various applications and programs 16.

In some embodiments, the system 100 allows users to image and/or video stream the writing surface 12, or the portion of the writing surface within the defined virtual boundary 22, in real-time. The system generates and shares a unique URL with other users (e.g., via text message link, email, etc.). The private, real-time page may be updated every time the writing surface 12 and/or the virtual boundary 22 is scanned. Additionally, or alternatively, illustrative embodiments may have an auto-scan mode, wherein the camera faces the writing surface and/or the virtual boundary 22, and automatically scans at a predetermined time (e.g., every 5 seconds, every minute, every 5 minutes, etc.). The automatic scanning time may be adjusted by the user.

Figure 7:
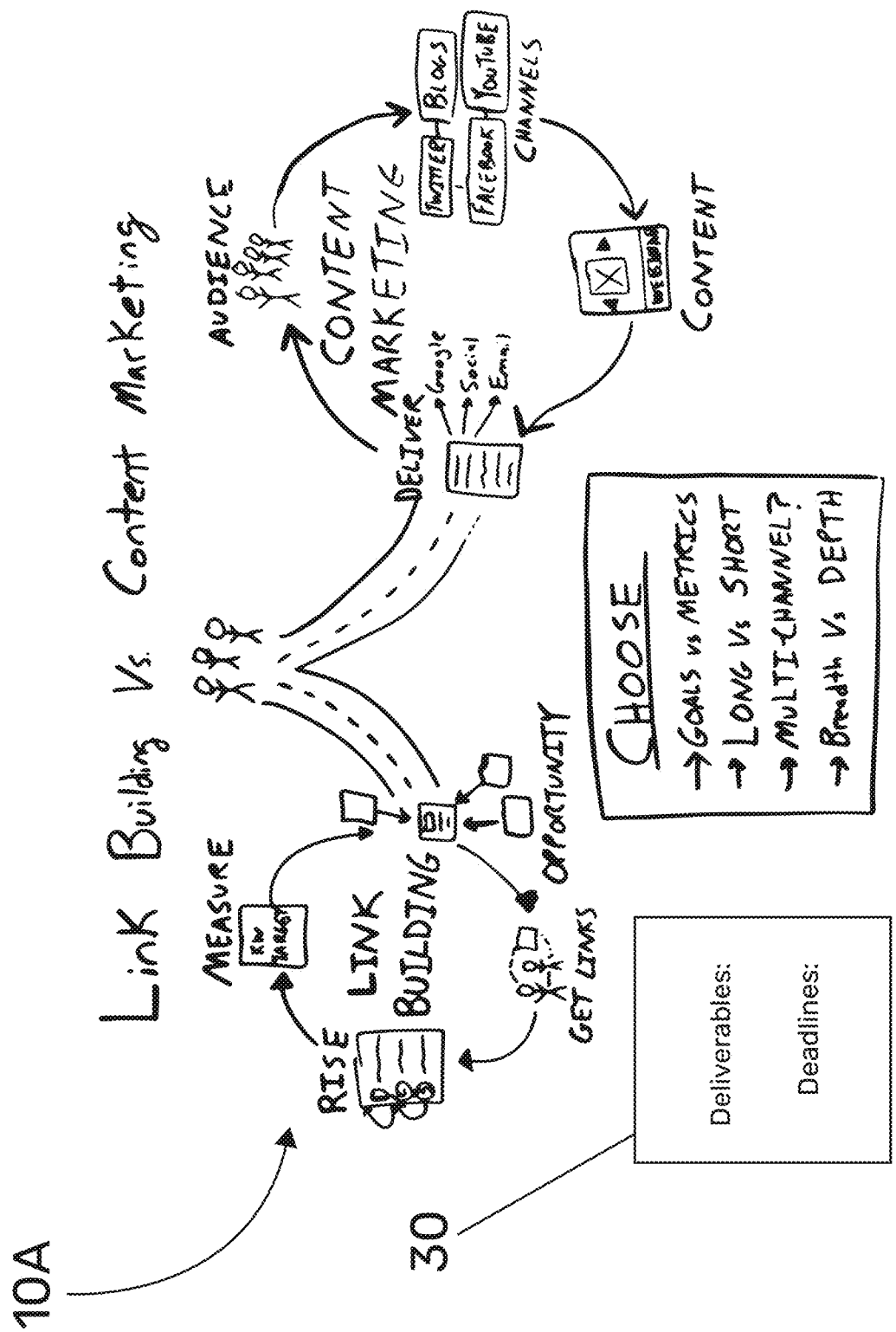
FIG. 7 schematically shows an updated image of the notes from FIG. 6 in accordance with illustrative embodiments of the invention.

FIG. 7 schematically shows an updated image 10A of the notes 10 from FIG. 6 in accordance with illustrative embodiments of the invention. As can be seen, new notes 30 were added to the notes 10 from FIG. 6. For example, the user may have drawn these new notes 30 on the writing surface 12. After the new notes 30 are added to the writing surface 12, the camera of the device 14 views the writing surface 12 and/or the markers 18 again, and a second image is produced using the processes described previously. This second image may be broadcast to the participants 15 in real-time. Thus, illustrative embodiments may provide broadcast updates of the writing surface 12. This process may be repeated many times. Additionally, these notes 10A may be erased, and an entirely new set of notes may be created and broadcast using the methods described herein. Illustrative embodiments may save the various images, and allow users to maintain a record of the various images scanned by the system 100 for review.

Figure 8:
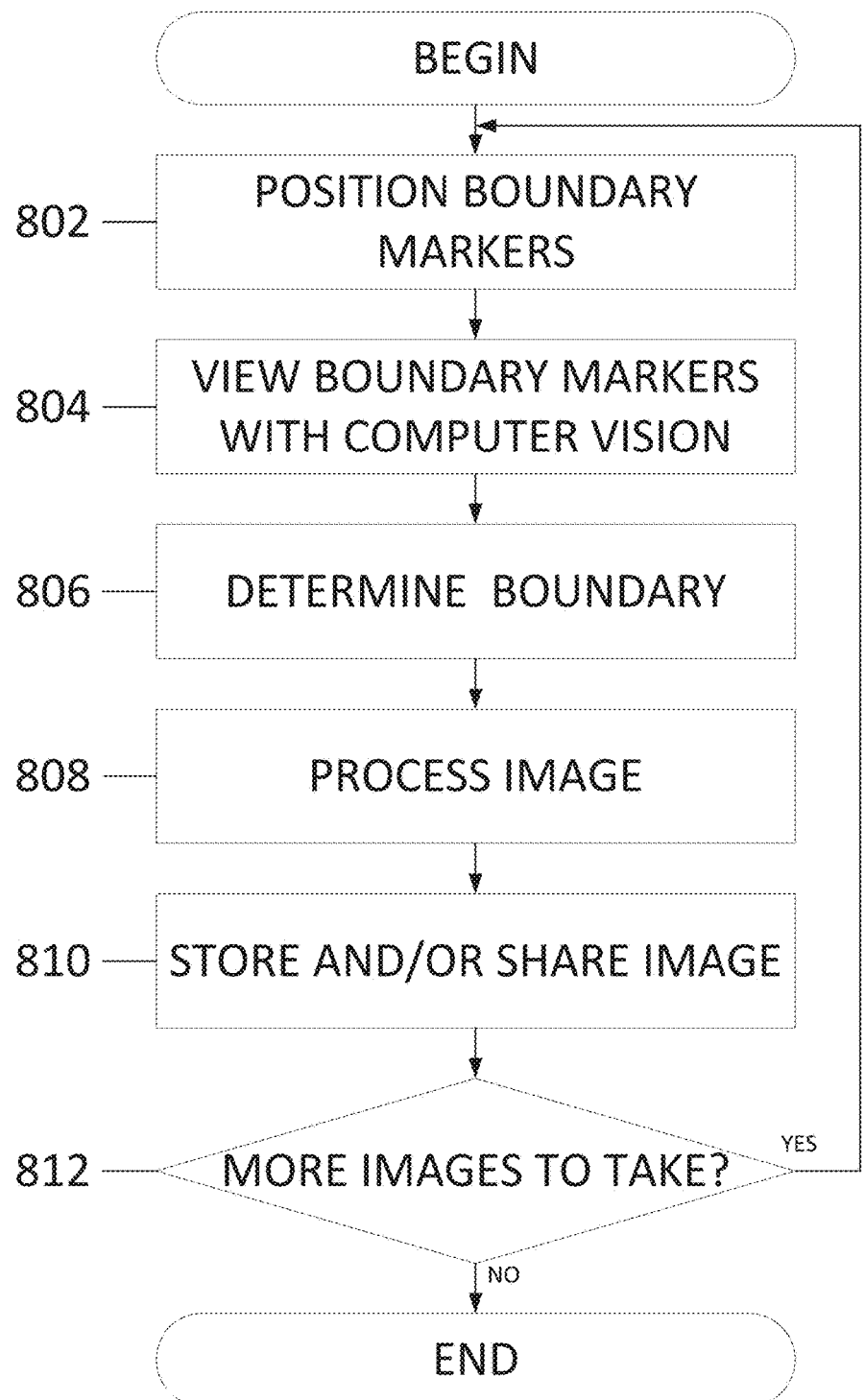
FIG. 8 shows a method of using the markers in accordance with illustrative embodiments of the invention.

FIG. 8 shows a method of using the markers 18 in accordance with illustrative embodiments of the invention. The method begins at step 802, which positions the boundary markers 18. As described previously, the boundary markers 18 may be positioned in a number of ways to define various kinds of boundaries 22. For example, the markers 18 may be positioned at four corners of a rectangle, at three points forming a triangle, and so on. In illustrative embodiments, the system 100 has logic that determines the shape formed, or the shape most closely approximated, by the markers 18, and deskews based on the determined shape. However, because conventional writing surfaces 12 are rectangular, it is expected that many use scenarios will be based on a rectangular shape. Accordingly, some embodiments may disregard (i.e., not detect a virtual boundary 22) configurations of markers 18 which are not positioned in or near edges of a defined shape (e.g., scattered randomly). Accordingly, illustrative embodiments may provide four markers 18 in a kit to easily define a rectangular virtual boundary 22.

The process proceeds to step 804, which identifies the boundary markers 18 with computer vision. The computer vision can be on any of the devices 14 described previously. When using the fluorescent triangular shaped markers 18, for example, the computer vision searches for the four bright orange triangles in the image on the screen. The system 100 may employ some color thresholds around the target color to find the markers 18 on the screen. For example, the system may look for an RGB color that is within some value of hue/saturation to ensure it detects the markers in a wide variety of environments (e.g., sunny v. dark). In some embodiments, a dynamic value may also be employed—the system may look for the shapes of the markers 18 (e.g., finds four triangular shaped markers 18 of the same color).

The process then proceeds to stop 806, which determines the boundary 22 based on the position of the markers 18. In illustrative embodiments, the markers are fluorescent to provide for easy distinguishing of the markers from the writing surface 12 and from the background in the image. As described previously, it is suspected that the glow of fluorescent colors helps the markers stick out more to computer vision, and is less likely to be confused as a shadow, a person, or a drawn shape (e.g., a drawn triangle). However, other embodiments may use non-fluorescent colors.

The process then proceeds to step 808, which processes the image. After finding all of the markers 18 (e.g., four triangles), the system 100 may take a snapshot and deskew the image (e.g., by using the known shape and proportions of the markers 18). The system 100 may also crop the image to the boundary 22 defined by the position of the markers 18. It should be understood that the system 100 may also deskew the image from a steep angle, as it can determine the angle (e.g., by detecting that the more distant markers 18 are smaller and warped relative to the closer markers 18). For example, when markers 18 are positioned at corners of a rectangle in the physical world, the virtual boundary 22 may appear like a trapezoid on the screen. The system can use the known marker 18 shape, and the known writing surface 12 shape, to stretch the image back to a rectangle.

In some embodiments, 3D data may be used to enhance the deskewing algorithm. For example, smartphones may detect 3D shape (e.g., similar to the facial recognition used to unlock the Apple® iPhone 10). The true 3D data may be used to more precisely determine the position of the markers 18 and to produce a more precisely deskewed image. Indeed, some embodiments may account for any position of the markers 18 even if they are not arranged in a predetermined shape (e.g., randomly scattered). The deskewed image may take on the shape defined by the position of the markers 18. In further steps, the deskewed images may optionally be cropped into a preferred shape (such as a rectangle).

In some embodiments, after cropping and deskewing the image, a final layer of image processing may be applied. Background and foreground detecting techniques can be used to enhance the image by using the known color of the markers 18 to correct for color distortion. For instance, if the color of the markers 18 in the image is dimmer than the expected color value, the image could be brightened. Additionally, or alternatively if the color of the markers is off (e.g., more yellow than orange), the image could be shifted away from yellow.

Although illustrative embodiments describe capturing an image, it should be understood that this process includes scanning or viewing the markers without saving the image. Thus, illustrative embodiments may initiate the processing described herein merely by viewing and identifying the markers 18, without requiring actively capturing (e.g., pushing a button and/or saving the image) to capture the image. However, some other embodiments may require that the user actively capture the image and/or save the image.

The process then proceeds to step 810, which stores and/or shares the images. The images may be stored locally, or on a cloud-based drive. Additionally, the images may be broadcast in real time, and on a continuous basis as described previously. The process then moves to step 812, which asks if there are more images to take. If there are more images to take, the process returns to step 802. This may be the case for example, if revisions or changes have been made to the notes 10, or if the user wishes to update the broadcast. If there are no more images to take, then the process comes to an end.

Some embodiments may operate without any markers 18. For example, the system 100 may identify a boundary, such as the edge of a chalkboard, whiteboard, and/or projector screen, and use that in place of the virtual boundary 22 defined by the markers 18 as discussed above. Accordingly, users can save images of notes 10 on a chalkboard, whiteboard, and/or projector screen in real time. Notes captured without markers may also be broadcast, deskewed, and saved in accordance with the methods described herein.

Although illustrative embodiments refer to using the markers 18 with reference to writing surfaces 12, it should be understood that illustrative embodiments may be used generally with machine vision. The inventors surprising discovery that fluorescent colors are more easily identifiable by machine vision may be used more generally in any field requiring machine vision identification. Accordingly, not all illustrative embodiments are intended to be limited in application to writing surfaces 12.

Indeed, illustrative embodiments may include a variety of surfaces 12 in place of the previously described writing surface(s) 12. For example, in some embodiments, the writing surface 12 may be a non-traditional writing surface 12, such as a road (e.g., where children draw with colored chalk), and the markers 18 may be placed on the road.

Figure 9:
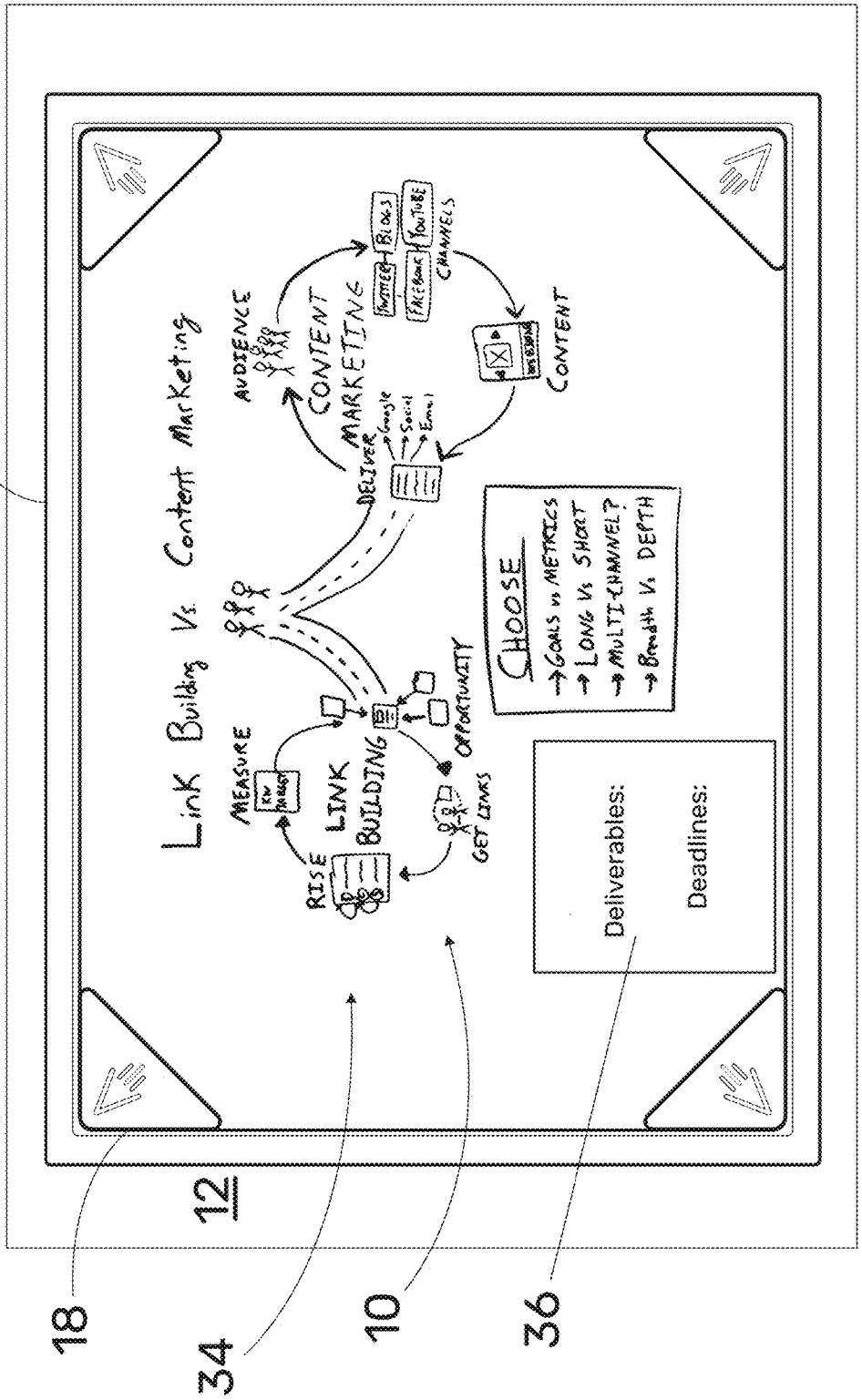
FIG. 9 schematically shows a frame configured to hold the markers in accordance with illustrative embodiments of the invention.

Additionally, or alternatively, some embodiments may capture, store, and/or share a background (i.e., instead of a writing surface 12). For example, the markers 18 may be held up against the background of the sky (from the perspective of the camera 14). To that end, FIG. 9 schematically shows a frame 32 (e.g., formed of metal or plastic) configured to hold the markers 18 in accordance with illustrative embodiments of the invention. The frame 32 may have a predetermined shape (e.g., rectangular) with markers 18 coupled thereto in a predetermined orientation and position. The markers 18 may be placed at the vertex of the frame 32 (e.g., at the four corners of a rectangular frame). Accordingly, the frame 32 provides an easy and convenient way to predefine the shape of the background image to be shared within the frame 32. Illustrative embodiments may otherwise process or operate on a background in a similar manner to the writing surface 12 (e.g., by identifying the markers 18, detecting the boundary 22, deskewing, enhancing, storing, and/or sharing the background image).

In some embodiments, the frame 32 may include a predefined background (e.g., as opposed to the open frame described above which allows the user to view the notes 10 on the whiteboard 12), such as a background of a location (e.g., a famous landmark such as the Eiffel tower in Paris, or the Colosseum in Rome). In some other embodiments, the predefined background may include a variety of backgrounds, such as various sports formations (e.g., football or basketball formations from a playbook). Accordingly, a coach could broadcast plays as he draws on the background.

Some embodiments may have a frame 32 with a transparent annotation surface 34 configured to overlay the background and or writing surface 12. The transparent surface 34 may be annotated 36 by a user (e.g., using a pen or other writing instrument). Accordingly, illustrative embodiments enable the system 100 to operate as a telestrator over some background or writing surface 12. Thus, the user may draw/annotate 36 over a moving video or still image. Furthermore, in some embodiments the system 100 may include a receiving headset (e.g., a helmet modified to include a video or image display screen). The system 100 may further broadcast the annotated image to the receiving headset.

It should be noted that this process can be a simplified version of a more complex process of using the markers 18. As such, the process may have additional steps that are not discussed. In addition, some steps may be optional, performed in a different order, or in parallel with each other. For example, step 812 may take place before any of steps 808 or 810. Accordingly, discussion of this process is illustrative and not intended to limit various embodiments of the invention. It should be noted this symbolic representation is one view of the logical flow of the system 100. Logical flow variants would not change the underlying enablement of the system using the algorithmic methods outlined above. Additionally, it should be understood that the process described above, although referring to images, could also apply to video.

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

It should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems are necessarily non-conventional because, absent special programming or configuration, the conventional components do not inherently perform the described non-conventional methods.

The activities described and claimed herein provide technological solutions to problems that arise squarely in the realm of technology. These solutions as a whole are not well-understood, routine, or conventional and in any case provide practical applications that transform and improve computers and computer systems.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A system for capturing, organizing, and storing handwritten notes, the system comprising:
    a plurality of boundary markers configured to be positioned on a writing surface, the plurality of boundary markers having a fluorescent color;
    a tangible non-transitory computer readable medium encoded with instructions which, when run on a camera-equipped computing device, causes the camera-equipped computing device to execute processes comprising:
    capturing an image of the writing surface having the fluorescent markers thereon,
    detecting the fluorescent colored boundary markers in the captured image;
    identifying a virtual boundary in the captured image based on the positions of the fluorescent colored boundary markers; and
    unwarping a portion of the captured image within the virtual boundary to produce an unwarped image.

2. A system according to claim 1, wherein the boundary markers are a fluorescent orange color.

3. A system according to claim 1, wherein the executed processes further comprise broadcasting the unwarped image and updating the broadcast as new images are captured.

4. A system according to claim 1, further comprising saving the unwarped image in an image store.

5. A system according to claim 1, wherein the processes further comprise cropping the boundary markers out of the image.

6. A system according to claim 1, wherein the processes further comprise:
    removing the background from the captured image,
    cropping the captured image using the virtual boundary in the image, and
    enhancing the image.

7. A system according to claim 1, wherein the processes performed by the computing device are performed in response to taking a picture of the writing surface.

8. A system according to claim 1, wherein the writing surface is a whiteboard or a wall.

9. A system according to claim 1, wherein the markers are generally shaped like triangles.

10. A method for capturing and storing handwritten notes, the method comprising:
    placing a plurality of boundary markers on a writing surface, such that the boundary markers define a virtual boundary encompassing the handwritten notes;
    capturing a writing surface image by scanning the writing surface with an electronic device;
    identifying the position of the markers in the writing surface image;
    determining the boundary based on the positions of the markers in the writing surface image;
    unwarping a portion of the captured image within the virtual boundary to produce an unwarped image; and
    cropping the unwarped image based on the position of the detected boundary.

11. The method as defined by claim 10, wherein placing the plurality of boundary markers comprises positioning the boundary markers at positions that approximately define corners of a rectangular boundary.

12. The method as defined by claim 10, further comprising broadcasting the unwarped image.

13. The method as defined by claim 12, further comprising capturing a second writing surface image by scanning the writing surface with the electronic device;
    identifying the position of the markers in the second writing surface image;
    determining the boundary based on the position of the markers in the second writing surface image;

unwarping the second writing surface image, as a function of detecting the boundary in the captured second writing surface image, to produce a second unwarped image;

cropping the second unwarped image based on the position of the detected boundary.

14. The method as defined by claim 13, further comprising updating the broadcasting of the unwarped image to broadcast the second unwarped image.

15. A system for sharing handwritten notes, the system comprising:

a computer device coupled with a camera, the camera configured to view a background having content;

a plurality of boundary markers having a fluorescent color and configured to be positioned between the background and the camera so as to define a virtual boundary around a portion of the background including the content, the computer device configured to: (1) detect the fluorescent color boundary markers, (2) determine the virtual boundary, and (3) deskew the portion of the background as a function of the shape of the virtual boundary to produce a deskewed image of the portion of the background, the computer device further configured to share the deskewed image of the portion of the background.

16. The system as defined by claim 15, further comprising a frame defining a perimeter on which the plurality of boundary markers are positioned, and an image portion within the perimeter.

17. The system as defined by claim 16, wherein the frame has a rectangular shape, and the boundary markers are positioned at corners of the frame.

18. The system as defined by claim 16, wherein the image portion has a predefined background.

19. The system as defined by claim 16, wherein the image portion is open and has no predefined background.

20. The system as defined by claim 16, wherein the frame includes a transparent annotation surface over the image portion.

* * * * *